(12) United States Patent
Prema et al.

(10) Patent No.: US 7,234,552 B2
(45) Date of Patent: Jun. 26, 2007

(54) METHOD FOR HEATING A BATTERY IN A HYBRID ELECTRIC VEHICLE

(75) Inventors: Mukunda V. Prema, Canton, MI (US); Shailesh S. Kozarekar, Novi, MI (US); Christopher A. Ochocinski, Canton, MI (US); Robert K. Taenaka, Plymouth, MI (US); Vincent Freyermuth, Ypsilanti, MI (US); Douglas Zhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 741 days.

(21) Appl. No.: 10/605,287

(22) Filed: Sep. 19, 2003

(65) Prior Publication Data

US 2005/0196662 A1 Sep. 8, 2005

(51) Int. Cl.
*B60K 6/00* (2006.01)

(52) U.S. Cl. .................. 180/65.2; 180/65.3; 903/926; 903/943

(58) Field of Classification Search ............... 903/926, 903/943; 180/65.2, 65.3
See application file for complete search history.

(56) References Cited

U.S. PATENT DOCUMENTS

| 6,118,237 | A | 9/2000 | Kikuchi et al. |
| 6,163,135 | A * | 12/2000 | Nakayama et al. ......... 320/150 |
| 6,215,198 | B1 * | 4/2001 | Inada et al. ............... 290/40 C |
| 6,232,748 | B1 * | 5/2001 | Kinoshita .................. 320/132 |
| 6,271,648 | B1 | 8/2001 | Miller |
| 6,408,968 | B1 | 6/2002 | Wakashiro et al. |
| 6,501,250 | B2 * | 12/2002 | Bito et al. ................. 320/152 |

* cited by examiner

*Primary Examiner*—Christopher P. Ellis
*Assistant Examiner*—John R. Olszewski
(74) *Attorney, Agent, or Firm*—David B. Kelley; Brooks Kushman P.C.

(57) ABSTRACT

A method for heating a battery in a hybrid electric vehicle. The hybrid electric vehicle has an engine, a battery, a motor generator powered by the engine or the battery, and a control module. The method includes the steps of determining a battery temperature and determining whether a tip-in event, a tip-out event, or a terminal voltage event has occurred. The polarity of the battery is reversed if the battery temperature is below a predetermined value and if a tip-in event, a tip-out event, or a terminal voltage event has occurred.

20 Claims, 3 Drawing Sheets

METHOD FOR HEATING A BATTERY IN A HYBRID ELECTRIC VEHICLE

BACKGROUND OF INVENTION

1. Field of the Invention

The present invention relates generally to the operation of hybrid vehicles, and more particularly to the operation of a battery system of a hybrid electric vehicle.

2. Background Art

Hybrid electric vehicles use an internal combustion engine and a battery as power sources for vehicle propulsion. In general, the battery performs poorly at cold temperatures. Specifically, cold temperatures affect battery chemistry and increase electrical resistance within the battery. As a result, the peak charge of the battery is limited and the peak battery discharge capability is reduced. Poor battery performance reduces torque to the vehicle wheels when battery power is utilized to propel the vehicle and increases reliance on the internal combustion engine. Greater reliance on the engine increases vehicle emissions and decreases fuel economy. In addition, poor cold temperature battery performance could result in the need to add external or secondary battery heating devices to the hybrid electric vehicle.

Cold temperatures also increase the effects of polarization resistance voltage of the battery, which at sufficiently high levels can prevent the battery from charging or discharging. Polarization resistance voltage can be temporarily lowered by reversing the polarity of the battery, such as by switching from discharging the battery to charging, or vice versa. Reducing the polarization resistance voltage allows more current to circulate through the battery. The current circulating through the battery interacts with the internal battery resistance (i.e., $I^2R$ loss), resulting in a battery temperature increase and improved battery performance at cold temperatures. However, battery current polarity reversals may be noticeable to vehicle occupants. For example, polarity reversals may be manifested as noise, intermittent engine revving, and hesitation in vehicle acceleration and may be particularly noticeable when cruising at a steady speed.

Consequently, there was a need for a method of heating a hybrid electric vehicle battery to improve battery performance and to do so in a manner that is not objectionable to vehicle occupants. Problems associated with prior art as noted above and other problems are addressed by Applicant's invention as summarized below.

SUMMARY OF INVENTION

According to one aspect of the present invention, a method for heating a battery in a hybrid electric vehicle is provided. The hybrid electric vehicle has an engine, a battery, a motor-generator powered by the engine or the battery and adapted to drive a vehicle wheel, and a control module for monitoring and controlling the hybrid electric vehicle. The method includes the steps of determining if a battery temperature is below a predetermined value, determining whether triggering event has occurred, and reversing polarity of the battery current if the battery temperature is below a predetermined value and a triggering event has occurred. The triggering event may be a "tip-in" event, a "tip-out" event, or a terminal voltage event. The polarity of the battery current may be reversed if the battery temperature is below a predetermined value and a tip-in event, a tip-out event, or a terminal voltage event has occurred.

The step of determining whether a tip-in event has occurred may include measuring battery voltage and not reversing polarity of the battery if the battery voltage is low. The step of determining whether a tip-out event has occurred may include measuring a battery voltage and not reversing the polarity of the battery current if the battery voltage is high.

A first slew rate may be used when reversing the polarity of the battery current for a tip-in event and a tip-out event. A second slew rate may be used when reversing the polarity of the battery current for a terminal voltage event. The first slew rate may be faster than the second slew rate.

The step of determining the temperature of the battery may include comparing a predetermined value to a measured value from a battery temperature sensor. The step of determining whether a tip-in event has occurred may be based on a change in position of a gas pedal position sensor. The step of determining whether a tip-out event has occurred may be based on the change in position of a brake pedal sensor or gas pedal position sensor. The step of determining whether the terminal voltage event has occurred may include comparing a terminal voltage value to a limit value that is indicative of the polarization resistance voltage of the battery.

According to another aspect of the invention, the method determines if a temperature of the battery is below a predetermined value and determines whether a previous polarity reversal has been completed. The method may also determine whether a tip-in event, tip-out event, or a terminal voltage event has occurred, and reverse the polarity of the battery current if the battery temperature is below the predetermined value, the previous polarity reversal has been completed, and a tip-in event, tip-out event, or a terminal voltage event has occurred. Reversing the polarity of the battery current may occur at a first slew rate for a tip-in event and a tip-out event and a second slew rate for a terminal voltage event.

The step of determining whether a previous polarity reversal has been completed may include determining whether the battery is charging or discharging after determining whether the previous polarity reversal has been completed. The step of reversing the polarity of the battery current may include calculating a power target level and reversing the polarity of the battery to the power target level. The step of determining whether a terminal voltage event has occurred may include determining whether the terminal voltage value is greater than a first limit value if the battery is discharging and determining whether the terminal voltage value is less than a second limit value if the battery is charging.

According to another aspect of the invention, the method includes the steps of determining if the temperature of the battery is below a predetermined value, determining whether a previous polarity reversal has been completed and preventing implementation of a subsequent polarity reversal until the previous polarity reversal has been completed, determining whether the battery is charging or discharging, and determining whether a terminal voltage event, a tip-in event, or a tip-out event has occurred. If a terminal voltage event has occurred, then the polarity of the battery current is reversed at a first slew rate. If a tip-in event or a tip-out event has occurred, then the polarity of the battery current is reversed at a second slew rate.

DETAILED DESCRIPTION

Figure 1:
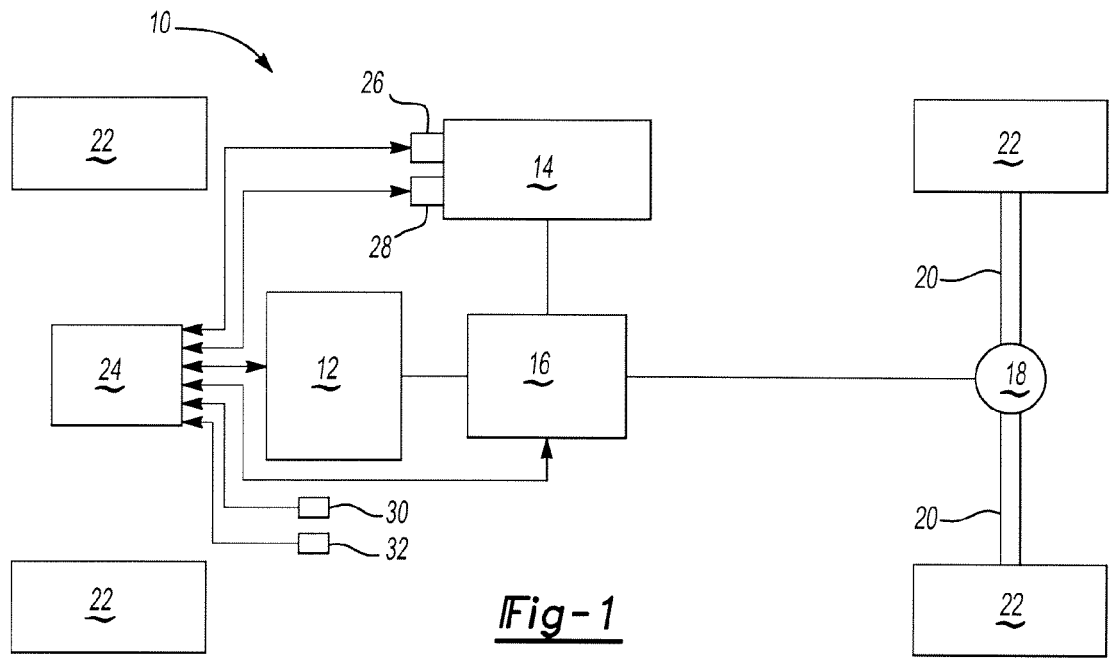
FIG. 1 is a schematic of a hybrid electric vehicle.

Referring to FIG. 1, a schematic of a hybrid electric vehicle 10 is shown. The hybrid electric vehicle 10 may have various drive train configurations, including a series hybrid drive, parallel hybrid drive, or split hybrid drive as is known by those skilled in the art. In addition, the hybrid electric vehicle 10 may be configured with energy recovery devices, such as a regenerative braking system.

The hybrid electric vehicle 10 includes an engine 12 and a battery 14 as power sources. The battery 14 may be a single cell battery or a battery pack comprising multiple bat or cells that are electrically interconnected. Power from the engine 12 or the battery 14 is provided to a motor-generator 16. The motor-generator 16 is adapted to the drive vehicle traction wheels. Specifically, the motor-generator 16 is connected to a differential 18 that is connected to a pair of axles 20 that are each connected to a vehicle wheel 22.

A control module 24 is used to monitor and control various aspects of the hybrid electric vehicle 10. For example, the control module 24 is connected to the engine 12 and motor-generator 16 to monitor and control their operation and performance. The control module 24 also processes inputs to determine whether the battery 14 should be heated. These inputs may include the battery temperature and voltage. Battery temperature is provided by a temperature sensor 26 located on the battery 14. Alternatively, multiple temperature sensors may be used. A voltage sensor 28 reads the terminal voltage of the battery 14. Optionally, multiple voltage sensors may be used. The control module 24 is also connected to a gas pedal position sensor 30 that detects when the driver wishes to increase or decrease vehicle velocity and a brake pedal position sensor 32 that detects the driver's braking input.

Figure 2:
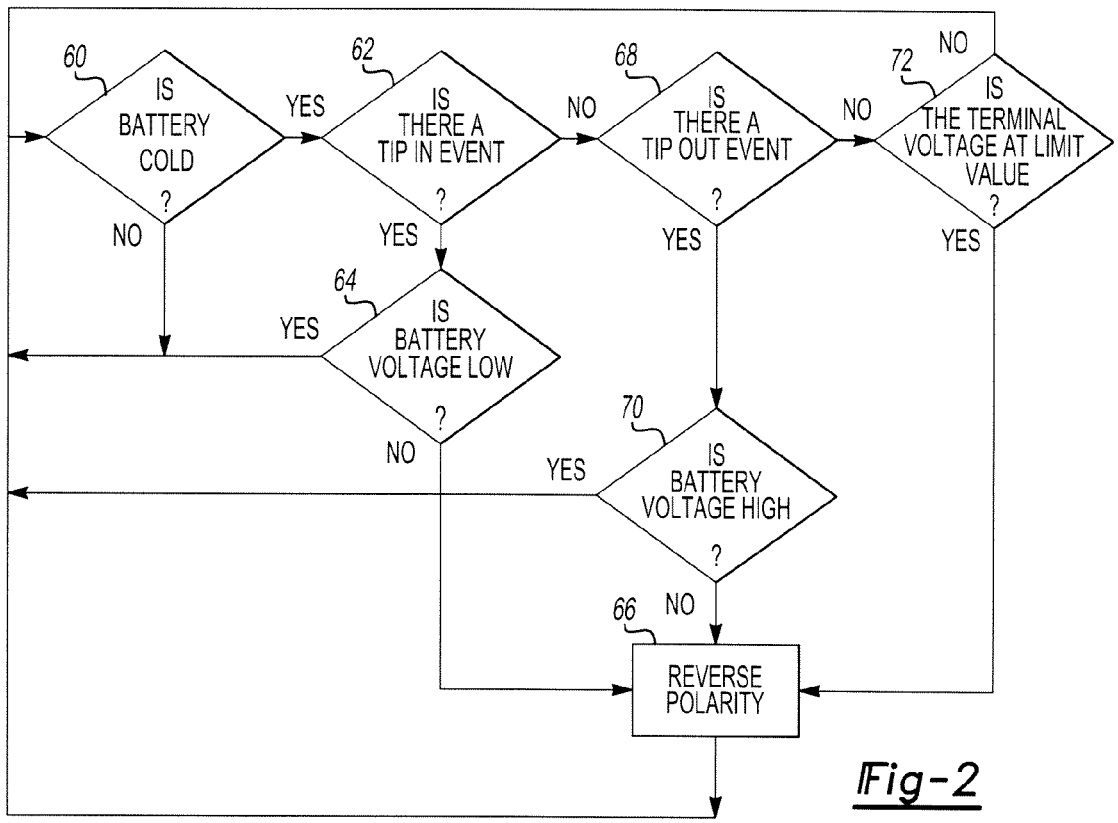
FIG. 2 is a flowchart of a method for heating a battery in the hybrid electric vehicle.

Referring to FIG. 2, a flowchart of a method for heating the hybrid electric vehicle battery is shown. At 60, the flowchart begins by determining whether the battery is cold. The battery is cold if the battery temperature is below a threshold temperature value. The threshold temperature value may be a predetermined constant based on battery specifications that is programmed into the memory of the control module. If the battery temperature is below the threshold temperature value, additional heating is desired in order to improve battery performance. If the battery temperature is not below the threshold value, additional efforts to increase battery temperature are unnecessary.

Next, at 62, the process determines whether a "tip-in" event has occurred. A tip-in event indicates that additional power or vehicle acceleration is demanded by the driver. A tip-in event may be indicated by detecting that the gas pedal has been pressed quickly. If a tip-in event has occurred, the battery voltage is assessed at 64 to determine whether sufficient battery voltage is available to provide the additional power demanded. If the battery voltage is low, additional power is not provided and the process returns to block 60. If the battery voltage is not low, then the polarity of the battery current is reversed at block 66, thereby reducing the polarization resistance voltage and heating the battery.

Similarly, at 68, the process determines whether a "tip-out" event has occurred. A tip-out event indicates that less power or vehicle deceleration is demanded by the driver. A tip-out event may be indicated by braking the vehicle, lifting off the gas pedal, or a combination of braking and/or lifting off the gas pedal. If a tip-out event has occurred, the battery voltage is assessed at 70 to determine whether the battery may be charged with energy recovered by a regenerative braking or other energy recovery system. If the voltage is high, then additional energy cannot be stored by the battery and the process returns to block 60. If the battery voltage is not too high, then the polarity of the battery is reversed at block 66, thereby reducing the polarization resistance voltage of the battery and increasing the rate of battery heating.

Continuing at 72, if there are no tip-in or tip-out events, the process assesses whether the terminal voltage of the battery has reached a limit value. The limit value is based on the polarization resistance voltage. If the terminal voltage is at the limit value, then the polarity of the battery is reversed at block 66 to temporarily nullify the polarization resistance voltage and increase the rate of battery heating. If the terminal voltage is not at the limit value, then the process returns to block 60.

Figure 3:
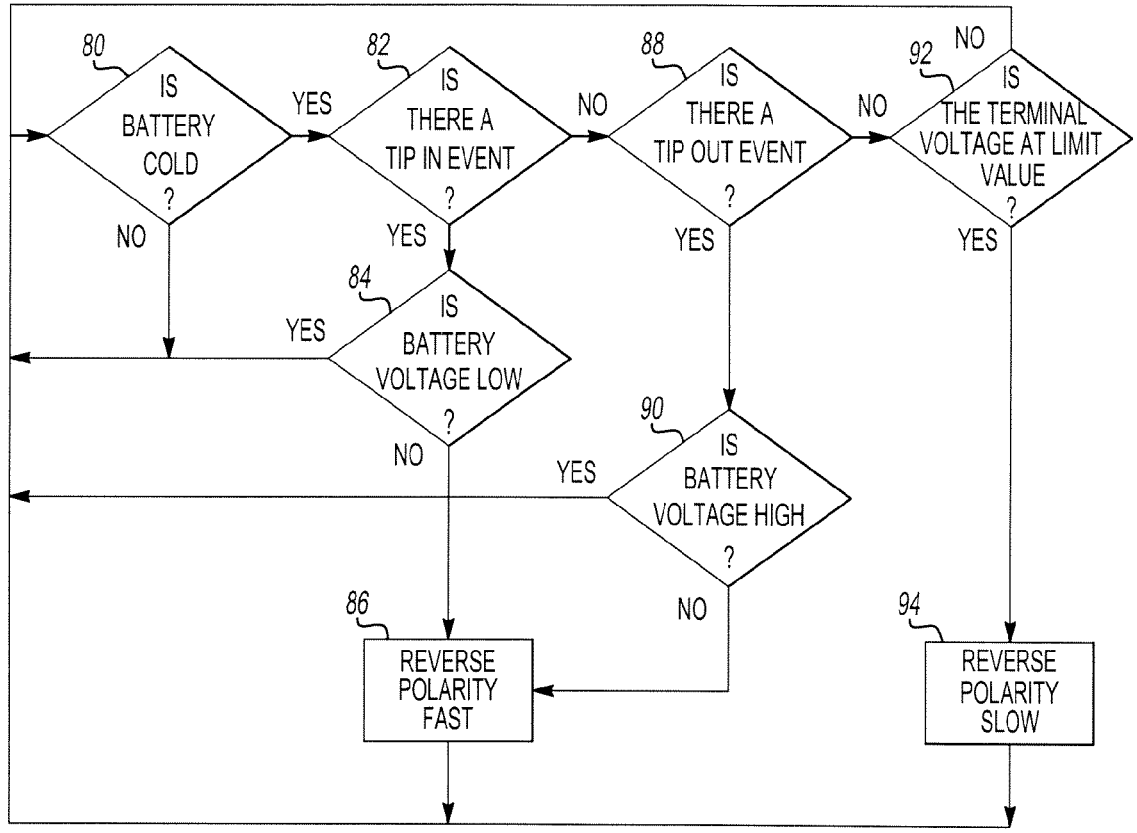
FIG. 3 is a second embodiment of the method for heating the battery in the hybrid electric vehicle.

Referring to FIG. 3, a flowchart of an alternate embodiment of the present invention is shown. This embodiment is identical to the embodiment shown in FIG. 2 except that the polarity of the battery is reversed at two different rates. More specifically, if a tip-in event occurs at 82 and the battery voltage is not low at 84, then the polarity of the battery is reversed quickly or at a high slew rate at 86. Likewise, if a tip-out event occurs at 88 and the battery voltage is not too high at 90, then the polarity is also reversed quickly at 86. However, at 92, if the terminal voltage is at the limit value, then the polarity is reversed at a slow slew rate at block 94. Optionally, additional polarity reversal slew rates may be employed. For example, a first slew rate may be used for a tip-in event, a second slew rate may be used for a tip-out event, and a third slew rate may be used for a terminal voltage event. Alternatively, any combination of equal or unequal slew rates could be used for each type of event.

A high slew rate helps make polarity reversals less noticeable to vehicle occupants since a reversal can be completed while the engine is accelerating or decelerating. Specifically, during a tip-in or a tip-out event, higher ambient noise levels mask noise due to the polarity reversal process. The driver may also expect the engine to rev up or down during a tip-in or tip-out event. For instance, when a tip-in event occurs, more energy is demanded from the battery and the internal combustion engine, which causes the engine to work harder and increases the noise level inside the vehicle. When a polarity reversal is not expected or initiated by the driver, a slower slew rate may be used. For example, a slow slew rate is used when a terminal voltage limit is reached since the increased ambient noise levels that accompany engine acceleration or deceleration are not present. The slow slew rate reduces the perceptibility of any change in engine speed or noise that may result from the terminal voltage limit polarity reversal. Consequently, configuring the method with multiple slew rates helps address occupant sensitivities to noise.

Figure 4:
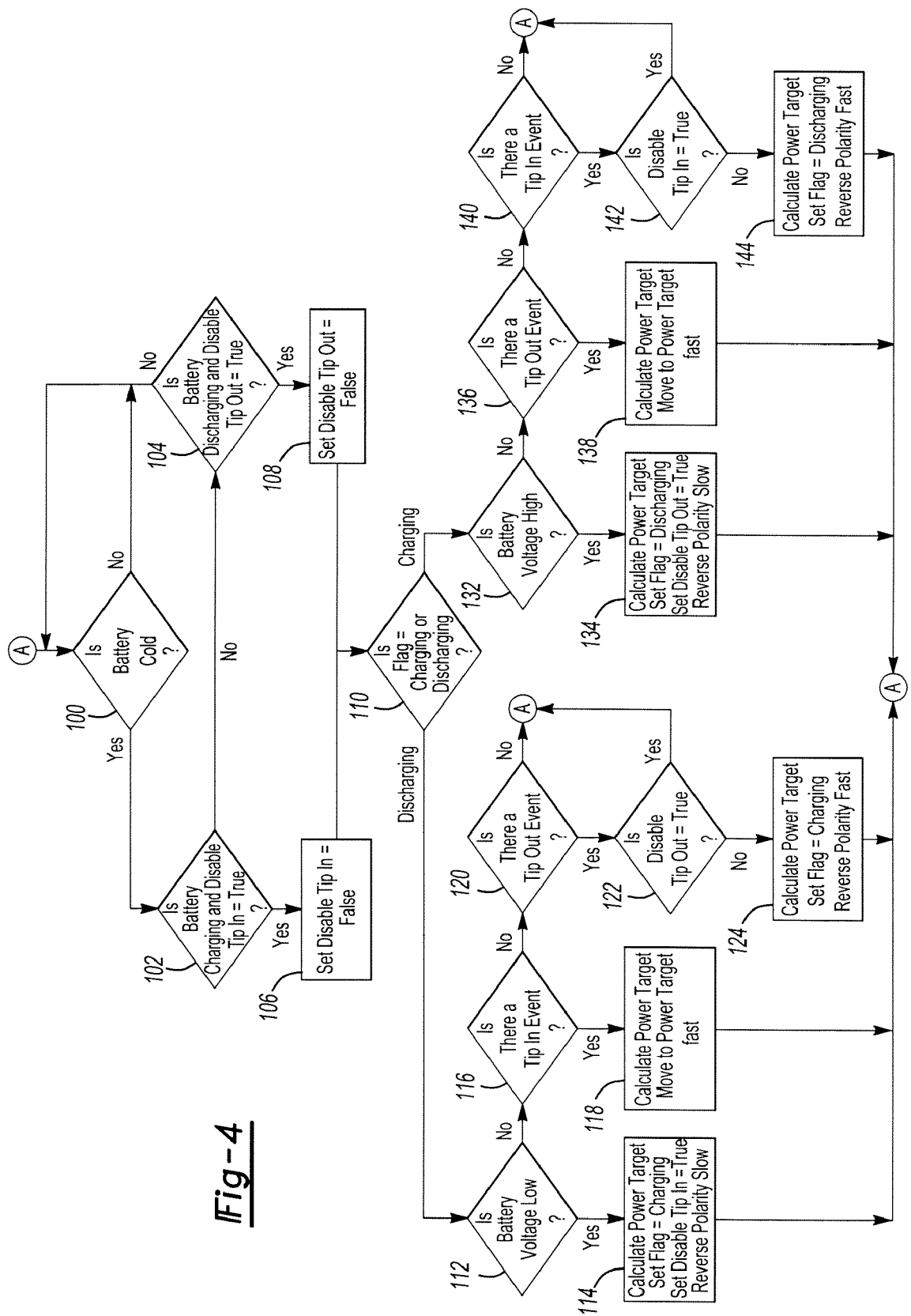
FIG. 4 is a third embodiment of the method for heating the battery in the hybrid electric vehicle.

Referring to FIG. 4, a flowchart of another alternate embodiment of the present invention is shown. This embodiment adds steps to the embodiment shown in FIG. 3 to make polarity reversals even less noticeable to vehicle occupants and to improve vehicle driveability.

At 100, the flowchart begins by determining whether the battery is cold as previously described. If the battery is not cold, additional heating is unnecessary. If the battery is cold, the process continues at 102.

Blocks 102, 104, 106, and 108 function together to prohibit polarity reversals based on a tip-in or a tip-out event when a previous polarity reversal has not been completed or when the polarization resistance voltage is too high or too low. The purpose of these steps is to ensure that the polarization resistance voltage is reduced before a subsequent polarity reversal request is implemented and to achieve more efficient battery heating.

Block 102 prevents a polarity reversal from charge to discharge in response to a tip-in event if the battery status flag is set to charging. The battery status flag, denoted by "Flag" in FIG. 4, indicates the desired direction of charge. For example, if the battery status flag is set to charging, the direction of current is being changed from discharge to charge. If the battery status flag is set to discharging, the direction of current is being changed from charge to discharge. Similarly, block 104 prevents a polarity reversal from discharge to charge due to a tip-out event if the battery status flag is set to discharge. Disabling a polarity reversal reduces the likelihood of exceeding battery charge limits or incurring an associated vehicle "quit on road" event, and helps achieve higher current flow and more efficient battery heating.

If blocks 102 and 104 both prevent a polarity reversal, the process returns to block 100. If either block 102 or block 104 permits a polarity reversal, then one of two flags, called Disable Tip-In or Disable Tip-Out, is set to false in blocks 106 and 108, respectively. Specifically, if an actual or measured battery status value indicates the battery is charging, then the polarization resistance voltage built up in the discharge direction has been overcome and a polarity reversal from charge to discharge (e.g., due to a tip-in event) is permissible. As a result, the Disable Tip-In flag is set to false at 106 to allow such polarity reversals based on a tip-in event. Similarly, if an actual or measured battery status value indicates the battery is discharging, then the polarization resistance voltage built up in the charge direction has been overcome and a polarity reversal from discharge to charge (e.g., due to a tip-out event) is permissible. As a result, the Disable Tip-Out flag is set to false at 108 to allow such polarity reversals based on a tip-out event.

Next, at 110, the process determines whether the battery status flag is set to charging or discharging. If the battery status flag is set to discharging, the process continues at block 112 and determines whether the battery voltage is low. If the battery voltage is low, the process continues at 114. At 114, a desired charge power target level is calculated, a battery status flag that indicates whether the direction of current is changing to charge or discharge is set to charging, the Disable Tip-In flag is set equal to true, and the polarity of the battery current is reversed at a slow slew rate.

The desired power target level can be determined using preprogrammed values in a look-up table or with an algorithm. For example, the physical charge limits of the battery and driver requests for additional power may be inputs. Since driver requests for additional power may be an input in deciding the power target level, the rate of battery heating may be adjusted in response to driver demands for performance and enhance vehicle driveability. A first power limit may be based on the physical limits of the battery and a second power limit may be based on a driver initiated power request. The first and second power limits may be compared to select the lowest value as a desired power target level.

At 116, if the battery voltage is not low, then the process determines whether there is a tip-in event. If there is a tip-in event, the new discharge power target level is calculated and the process adjusts the battery utilization to that power target at a fast slew rate at 118.

Continuing at 120, if there is no tip-in event at block 116, the process determines whether there is a tip-out event. If there is a tip-out event, the value of Disable Tip-Out is tested at 122. If Disable Tip-Out is false, then a polarity reversal to charge is permitted. At 124, a new charge power target is calculated, the battery status flag is set equal to charging, and the polarity is reversed rapidly. If there is not a tip-out event at 120 or if Disable Tip-Out is true, then a polarity reversal is not implemented and the process returns to the beginning as denoted by the circled letter A.

Returning to 110, if the battery is charging, process steps similar to that used when the battery is discharging are employed. At 132, the process determines whether the battery voltage is high. If the battery voltage is high, the process continues at 134. At 134, a desired discharge power target level is calculated, the battery status flag is set to discharging, the Disable Tip-Out flag is set to true, and the polarity is reversed slowly.

At block 136, the process determines whether there is a tip-out event. If there is a tip-out event, a new charge power target is calculated and the process adjusts battery utilization to that power target at a fast slew rate at 138.

Continuing at 140, if there is no tip-out event at block 136, then the process determines whether there is a tip-in event. If there is a tip-in event, the value of Disable Tip-In is tested at 142. If Disable Tip-In is false, then a polarity reversal to discharge is permitted. At 144, a new discharge power target is calculated, the battery status flag is set equal to discharging, and the polarity is reversed fast.

If there is not a tip-in event at 140, or if Disable Tip-In is true, then a polarity reversal is not implemented and the process returns to the beginning as denoted by the circled letter A.

Figure 5:
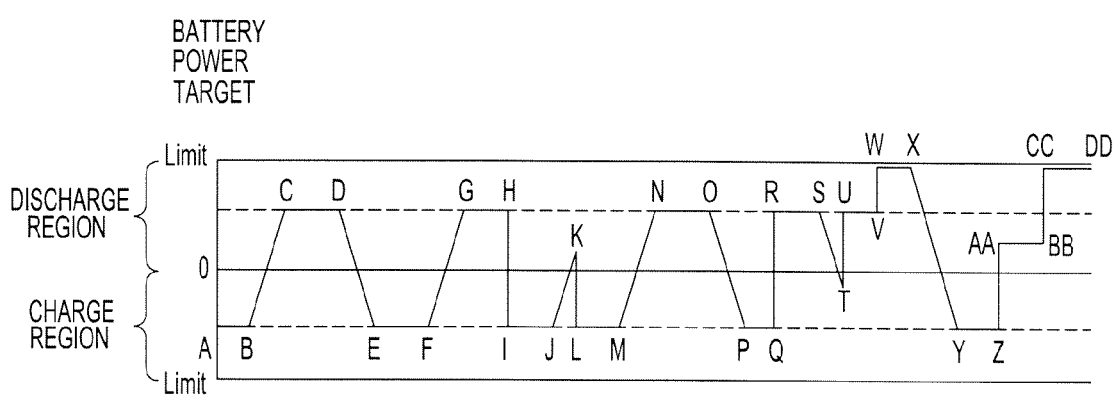
FIG. 5 is a plot depicting the operation of the battery under the method for heating the battery in the hybrid electric vehicle.

Referring to FIG. 5, a plot of how the method relates to the power demands on the battery is shown. In the plot, the horizontal axis represents time and the vertical axis represents the battery power target level. The battery is discharging in the region above the zero power line and is charging in the region below the zero power line. The horizontal lines labeled "limit" denote the physical charge and discharge limits of the battery.

Starting at point A and moving from left to right, the battery is charging between points A and B. At point B, the terminal voltage reaches the polarization resistance voltage limit value and the battery cannot take additional charge without first reversing the battery polarity. The battery current is reversed at a slow slew rate from points B and C. The polarity reverses when the zero line separating the charge and discharge regions is crossed.

From point C to D, the battery is discharging. At point D, the polarization resistance voltage limit of the battery is reached and the polarity must again be reversed. The battery current polarity is reversed at a slow slew rate from points D to E.

From point E to point F, the battery is charging. At point F, the polarization resistance voltage limit is reached. The battery current polarity is reversed at a slow slew rate from point F to point G. The battery discharges between points G and H. At point H, a tip-out event occurs. The battery current polarity is reversed at a fast slew rate between points H and I.

From point I to point j, the battery is charging. At point j, the polarization resistance voltage limit is reached. While the polarity is being reversed between points J and K, another tip-out event occurs. At point K the battery current has already changed direction (i.e., point K is on the opposite side of the zero line from point J), which means the polarity resistance voltage has been overcome. Consequently, a polarity reversal back to the charge region is permitted.

From point L to point M, the battery is charging. At point M, the polarization resistance voltage limit is reached and the polarity is reversed from point M to point N. The battery is discharging from point N to point O. At point O, the polarization voltage limit is reached and the battery current polarity is reversed at a slow slew rate between points O and P.

From point P to point Q, the battery is charging. At point Q, a tip-in event occurs. The battery current polarity is reversed at a high slew rate from point Q to point R.

From point R to point S, the battery is discharging. At point S, the polarization resistance voltage is met. From point S to point T, the polarity is reversed. While the polarity is being reversed, a tip-in event occurs at point T. Since point T has a different polarity than point S, a polarity reversal to discharge is allowed and the polarity is reversed at a high slew rate to point U.

From point U to point V, the battery is discharging. At point V, another tip-in event occurs. A new discharge power target is calculated and established at point W. From point W to point X, the battery continues to discharge. At point X, the polarization voltage limit is reached and the polarity is reversed at a slow slew rate to point Y.

From point Y to Z, the battery is charging. At point Z, a tip-in event occurs. A new discharge power target level AA is calculated and established at a high slew rate. From point AA to point BB, the battery is discharging. At point BB, another tip-in event occurs. A new discharge power target CC is calculated and established at a high slew rate. The process of reversing polarity and establishing power target levels continues based on changes in battery status and driver inputs.

While several embodiments for carrying out the invention have been described in detail, those familiar with the art to which this invention relates will recognize various alternative designs and embodiments for practicing the invention, as defined by the following claims.

The invention claimed is:

1. A method for heating a battery in a hybrid electric vehicle, the hybrid electric vehicle having an engine, a battery, and a control module for monitoring and controlling the hybrid electric vehicle, the method comprising the steps of:
   determining whether a temperature of the battery is below a predetermined value;
   determining whether a triggering event has occurred; and
   reversing polarity of a battery current when the temperature of the battery is below the predetermined value and the triggering event has occurred, wherein reversing polarity of the battery occurs at a first slew rate for a tip-in event and a second slew rate for a terminal voltage event.

2. The method of claim 1 wherein the step of determining whether a triggering event has occurred includes determining whether a tip-in event, a tip-out event, or a terminal voltage event has occurred.

3. The method of claim 2 wherein determining whether a tip-in event has occurred comprises measuring a battery voltage and not reversing the polarity of the battery current if the battery voltage is low.

4. The method of claim 2 wherein determining whether a tip-out event has occurred comprises measuring a battery voltage and not reversing the polarity of the battery current if the battery voltage is high.

5. The method of claim 2 wherein reversing the polarity of the battery occurs at a first slew rate for the tip-in event and the tip-out event, and a second slew rate for the terminal voltage event.

6. The method of claim 5 wherein the first slew rate is faster than the second slew rate.

7. The method of claim 1 wherein the step of determining the temperature of the battery comprises comparing the predetermined value to a measured value from a battery temperature sensor.

8. The method of claim 2 wherein determining whether a tip-in event has occurred is based on a change in position of a gas pedal position sensor.

9. The method of claim 2 wherein determining whether a tip-out event has occurred is based on the change in position of a brake pedal position sensor or the gas pedal position sensor.

10. The method of claim 2 wherein the step of determining whether a terminal voltage event has occurred comprises comparing a terminal voltage value to a limit value that is indicative of the polarization resistance voltage of the battery.

11. A method for heating a battery in a hybrid electric vehicle, the hybrid electric vehicle having an engine, a battery, a motor-generator powered by the engine or the battery and adapted to drive a vehicle wheel, and a control module for monitoring and controlling the hybrid electric vehicle, the method comprising the steps of:
   determining if a temperature of the battery is below a predetermined value;
   determining whether a previous polarity reversal has been completed;
   determining whether a tip-in event has occurred;
   determining whether a tip-out event has occurred;
   determining whether a terminal voltage event has occurred; and
   reversing polarity of a battery current if the temperature of the battery is below the predetermined value and the previous polarity reversal has been completed and a tip-in event, tip-out event, or a terminal voltage event has occurred.

12. The method of claim 11 wherein reversing the polarity of the battery current occurs at a first slew rate for the tip-in event and the tip-out event, and a second slew rate for the terminal voltage event.

13. The method of claim 11 wherein the step of determining whether a previous polarity reversal has been completed further comprises determining whether the battery is charging or discharging after determining whether the previous polarity reversal has been completed.

14. The method of claim 11 wherein the step of determining whether a terminal voltage event has occurred further comprises comparing a measured terminal voltage value to a limit value that is indicative of the polarization resistance voltage of the battery.

15. The method of claim 14 wherein the step of determining whether a terminal voltage event has occurred further comprises determining whether the terminal voltage value is greater than a first limit value if the battery is discharging.

16. The method of claim 14 wherein the step of determining whether a terminal voltage event has occurred further comprises determining whether the terminal voltage value is less than a second limit value if the battery is charging.

17. The method of claim 11 wherein the step of reversing the polarity of the battery further comprises calculating a power target level and reversing the polarity of the battery current to the power target level.

18. The method of claim 11 wherein the step of determining whether a tip-in event has occurred is based on a change in position of a gas pedal position sensor.

19. The method of claim 11 wherein the step of determining whether a tip-out event has occurred is based on the change in position of a brake pedal position sensor or a gas pedal position sensor.

20. A method for heating a battery in a hybrid electric vehicle, the hybrid electric vehicle having an engine, a battery, a motor-generator powered by the engine or the battery and adapted to drive a vehicle wheel, and a control module for monitoring and controlling the hybrid electric vehicle, the method comprising the steps of:

determining if a temperature of the battery is below a predetermined value;

determining whether a previous polarity reversal has been completed and preventing a subsequent polarity reversal from being implemented until the previous polarity reversal has been completed;

determining whether the battery is charging or discharging;

determining whether a terminal voltage event has occurred and reversing polarity of a battery current at a first slew rate if the terminal voltage event has occurred;

determining whether a tip-in event has occurred and reversing the polarity of the battery current at a second slew rate if the tip-in event has occurred; and determining whether a tip-out event has occurred and reversing the polarity of the battery current at a second slew rate if the tip-out event has occurred.

\* \* \* \* \*